(12) United States Patent
Kawaguchi (10) Patent No.: US 11,467,893 B2
(45) Date of Patent: Oct. 11, 2022

(54) NON-TRANSITORY STORAGE MEDIUM STORING PROGRAM READABLE BY INFORMATION PROCESSING APPARATUS INCLUDING SHARED STORAGE AREA, INFORMATION PROCESSING APPARATUS INCLUDING SHARED STORAGE AREA, AND INFORMATION PROCESSING METHOD FOR SHARED STORAGE AREA

(71) Applicant: Brother Kogyo Kabushiki Kaisha, Nagoya (JP)

(72) Inventor: Masafumi Kawaguchi, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/159,403

(22) Filed: Jan. 27, 2021

(65) Prior Publication Data
US 2021/0240555 A1    Aug. 5, 2021

(30) Foreign Application Priority Data
Jan. 31, 2020    (JP) .............................. JP2020-015260

(51) Int. Cl.
*H04N 1/00* (2006.01)
*H04N 1/21* (2006.01)
*G06F 9/54* (2006.01)

(52) U.S. Cl.
CPC ......... *G06F 9/543* (2013.01); *H04N 1/00204* (2013.01); *H04N 1/00408* (2013.01);
(Continued)

(58) Field of Classification Search
CPC ... H04N 1/00204; H04N 1/00408; H04N 1/21
See application file for complete search history.

(56) References Cited

U.S. PATENT DOCUMENTS 5,596,753 A * 1/1997 Bhatt ................. H04N 1/00236
719/320
5,689,755 A * 11/1997 Ataka ................ H04N 1/32502
399/1

(Continued)

FOREIGN PATENT DOCUMENTS

JP    2016-072849 A    5/2016

*Primary Examiner* — Nicholas Pachol
(74) *Attorney, Agent, or Firm* — Burr & Brown, PLLC (57) ABSTRACT

A non-transitory storage medium stores a program readable by a computer of an information processing apparatus. The information processing apparatus comprises a processing unit and a storage unit. The information processing apparatus executes a first processing and a second processing. The storage unit includes a shared storage area. The processing unit executes, in the first processing, (i) a storing processing of storing image data, as a file into a file storage area, received from an image processing apparatus capable of communicating with the information processing apparatus, and (ii) a copy processing of storing, into the shared storage area, at least a part of a path name designated to the file stored in the storing processing as data to be processed. The processing unit executes, in the second processing, a paste processing of pasting the data to be processed stored in the shared storage area to a paste target area.

9 Claims, 8 Drawing Sheets

(52) U.S. Cl.
CPC ....... *H04N 1/21* (2013.01); *H04N 2201/0087* (2013.01); *H04N 2201/0094* (2013.01)

(56) References Cited

U.S. PATENT DOCUMENTS

| | | | |
|---|---|---|---|
| 2001/0045964 A1* | 11/2001 | Camara | H04N 1/00416 715/810 |
| 2002/0122071 A1* | 9/2002 | Camara | G06F 3/0481 715/810 |
| 2002/0136426 A1* | 9/2002 | Davis | G06F 21/10 382/100 |
| 2004/0212835 A1* | 10/2004 | Neff | H04N 1/3873 358/1.18 |
| 2005/0192920 A1* | 9/2005 | Hodge | G06F 16/94 |
| 2006/0195495 A1* | 8/2006 | Asano | H04L 67/125 708/111 |
| 2009/0049375 A1* | 2/2009 | Aughenbaugh | G06F 40/171 715/780 |
| 2016/0048209 A1* | 2/2016 | Park | G11B 27/105 345/173 |
| 2016/0094731 A1 | 3/2016 | Nakamura et al. | |
| 2017/0208201 A1* | 7/2017 | Saito | H04N 1/0022 |
| 2020/0233552 A1* | 7/2020 | Onyekwelu | G06F 3/0486 |

* cited by examiner

NON-TRANSITORY STORAGE MEDIUM STORING PROGRAM READABLE BY INFORMATION PROCESSING APPARATUS INCLUDING SHARED STORAGE AREA, INFORMATION PROCESSING APPARATUS INCLUDING SHARED STORAGE AREA, AND INFORMATION PROCESSING METHOD FOR SHARED STORAGE AREA

CROSS REFERENCE TO RELATED APPLICATION

The present application claims priority from Japanese Patent Application No. 2020-015260, which was filed on Jan. 31, 2020, the disclosure of which is herein incorporated by reference in its entirety.

BACKGROUND

The following disclosure relates to a non-transitory storage medium storing a program readable by a information processing apparatus, an information processing apparatus, and an information processing method.

There is known a technique which receives image data from an image processing apparatus and stores the image data as a file.

SUMMARY

In the case where the image data is stored as the file as described above, a user wishes to open the file by another application software (hereinafter abbreviated to another application) different from an application which has executed the storing processing. However, in this case, the user has to memorize a path name of the file or a path name of a folder of the file and to execute an operation of inputting such path name by said another application, which is appropriately troublesome.

An aspect of the present disclosure relates to a technique in which, after image data is stored as a file, the file is easily accessible.

In an aspect of the disclosure, a non-transitory storage medium stores a program readable by a computer of an information processing apparatus. The information processing apparatus comprises a processing unit and a storage unit. When executed by the computer, the program causes the information processing apparatus to execute a first processing and a second processing. The storage unit includes a shared storage area accessed by the processing unit at the time of executing the first processing and the second processing. When executed by the computer, the program causes the information processing apparatus to execute, in the first processing, (i) a storing processing of storing image data, as a file into a file storage area, received from an image processing apparatus capable of communicating with the information processing apparatus, and (ii) a copy processing of storing at least a part of a path name, as data to be processed into the shared storage area, the path name being designated to the file stored in the storing processing, and, in the second processing, a paste processing of pasting the data to be processed stored in the shared storage area to a paste target area.

In another aspect of the disclosure, an information processing apparatus comprises a processing unit; and a storage unit. The processing unit executes at least a first processing and a second processing. The storage unit includes a shared storage area accessed by the processing unit at the time of executing the first processing and the second processing. The processing unit is configured to execute, in the first processing, (i) a storing processing of storing image data, as a file into a file storage area, received from an image processing apparatus capable of communicating with the information processing apparatus, and (ii) a copy processing of storing at least a part of a path name, as data to be processed into the shared storage area, the path name being designated to the file stored in the storing processing, and, in the second processing, a paste processing of pasting the data to be processed stored in the shared storage area to a paste target area.

In another aspect of the disclosure, an information processing method of an information processing apparatus comprises a first processing step, and a second processing step. The information processing apparatus includes a processing unit and a storage unit. The storage unit includes a shared storage area accessed by the processing unit at the time of executing the first processing step and the second processing step. The first processing step includes a storing processing step of storing image data, as a file into a file storage area, received from an image processing apparatus capable of communicating with the information processing apparatus, and a copy processing step of storing at least a part of a path name, as data to be processed into the shared storage area, the path name being designated to the file stored in the storing processing step. The second processing step includes a paste processing step of pasting the data to be processed stored in the shared storage area to a paste target area.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which.

EMBODIMENTS

Hereinafter, a non-transitory storage medium storing a program readable by a information processing apparatus, the information processing apparatus and an information processing method will be explained by citing illustrative embodiments.

[Configuration of Information Processing Apparatus and Image Processing System]

Figure 1:
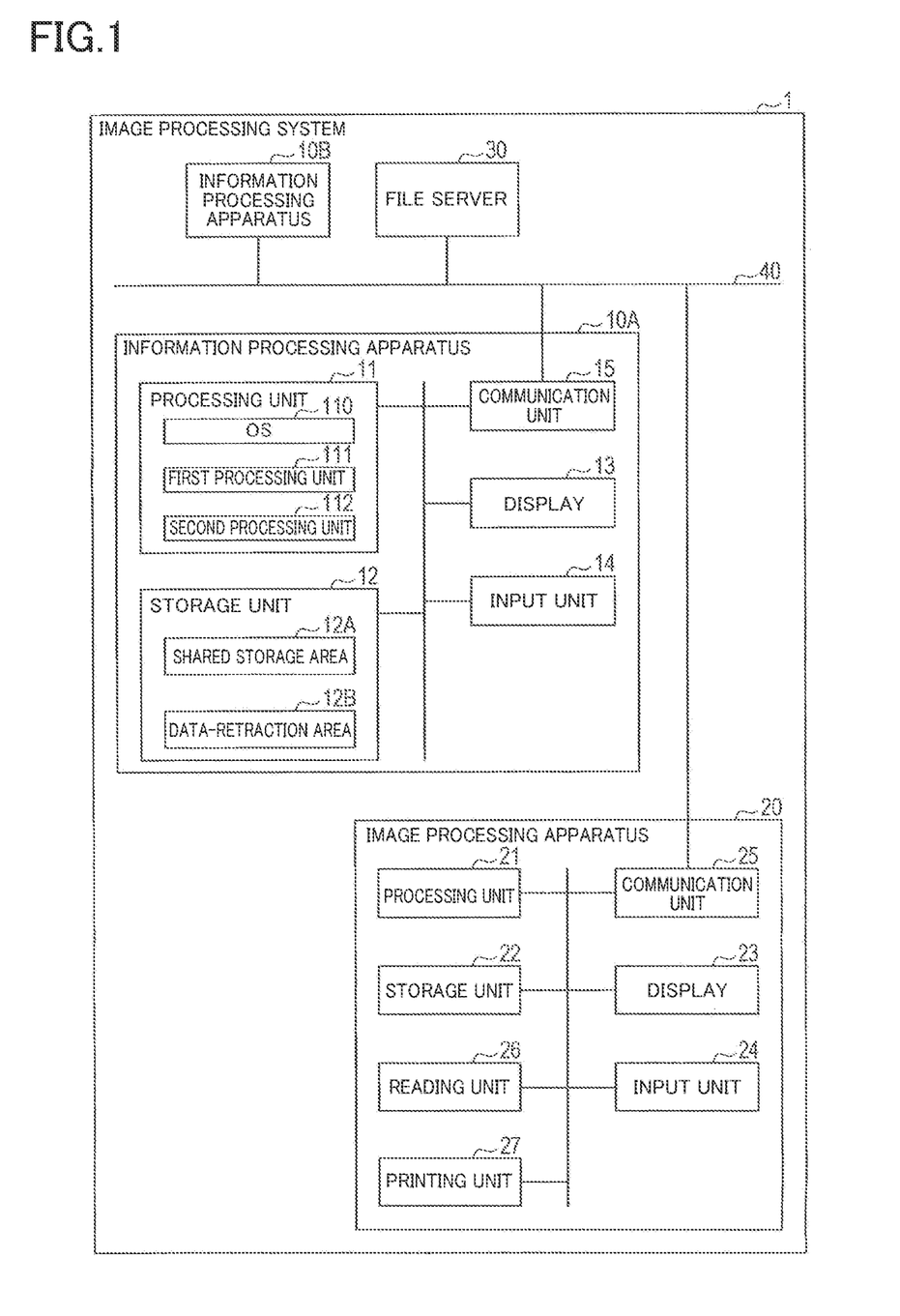
FIG. 1 is a system configuration diagram illustrating an image processing system including an information processing apparatus.

As illustrated in FIG. 1, an image processing system 1 includes information processing apparatuses 10A, 10B (for example, personal computers), an image processing apparatus 20 (for example, a MFP), and a file server 30. These apparatuses are respectively connected to a LAN 40, and are configured to communicate with one another via the LAN 40.

The information processing apparatus 10A includes a processing unit 11, a storage unit 12, a display 13, an input unit 14, and a communication unit 15. The information processing apparatus 10B has the same configuration as that of the information processing apparatus 10A, though not illustrated.

The processing unit 11 includes a CPU. The storage unit 12 includes a non-transitory tangible recording medium (for example, a semiconductor memory typified by a ROM, a RAM, a NVRAM and a flash memory, an auxiliary storage device typified by a SSD (Solid State Drive) and a HDD (Hard Disk Drive), and so on). The storage unit 12 stores various software and data. The processing unit 11 executes processing and control in accordance with a program stored in the storage unit 12 to realize various functions possessed by the information processing apparatus 10A. The realization of various functions by the processing unit 11 is not limited to realization by executing the program, but a part of or all functions may be realized by using one or a plurality of hardware.

In the processing unit 11, a plurality of software products function in parallel. As software relating to the embodiment, an OS (Operating System) 110, a first processing unit 111, and a second processing unit 112 can be cited. The OS 110 is basic software for controlling and managing hardware of in the information processing apparatus 10A. The first processing unit 111 is one of application software functioning in the processing unit 11. The first processing unit 111 has a function of obtaining image data scanned by the image processing apparatus 20 (hereinafter referred to also as a scan result). The second processing unit 112 is one of application software functioning in the processing unit 11. The second processing unit 112 has a function of editing a text file.

In the storage unit 12, a shared storage area 12A and a data-retraction area 12B are provided as storage areas relating to the embodiment. The shared storage area 12A is a storage area accessible from both of the first processing unit 111 and the second processing unit 112. In the embodiment, a clipboard provided by the OS 110 is used as the shared storage area 12A. In the following explanation, the shared storage area 12A is referred to also as a clipboard 12A. The data-retraction area 12B is used for temporarily storing information stored in the clipboard 12A in a processing described later.

The display 13 includes a display device (for example, a liquid crystal display or an organic EL display), which is configured to display various images. The input unit 14 includes a device for input (for example, a mouse as a pointing device and a keyboard) and an input controller configured to process the input from the device for input. The user can input various commands with respect to the information processing apparatus 10A by an input operation in the input unit 14.

The communication unit 15 includes a network interface controller compliant with LAN standards. The communication unit 15 may be configured to execute communication via either of a wireless LAN and a wired LAN. The communication unit 15 may also be configured by a communication interface compliant with a communication standard other than LAN standards (for example a USB standard).

The image processing apparatus 20 includes a processing unit 21, a storage unit 22, a display 23, an input unit 24, a communication unit 25, a reading unit 26, and a printing unit 27. The processing unit 21 includes a CPU. The storage unit 22 includes the non-transitory tangible recording medium (for example, the semiconductor memory typified by the ROM, the RAM, the NVRAM and the flash memory). The storage unit 22 stores software for controlling respective units of the image processing apparatus 20 and data.

The processing unit 21 executes processing and control in accordance with a program stored in the storage unit 22 to realize various functions possessed by the image processing apparatus 20. The realization of various functions by the processing unit 21 is not limited to realization by executing the program, but a part of or all functions may be realized by using one or a plurality of hardware.

The display 23 includes a display device (for example, the liquid crystal display or the organic EL display), which is configured to display various images. The input unit 24 includes a device for input for receiving various input operations. The input unit 24 of the embodiment includes a transparent touch panel as the device for input. The transparent touch panel is disposed so as to be stacked on the display device of the display 23.

The communication unit 25 includes a network interface controller compliant with LAN standards. The communication unit 15 may be configured to execute communication via either of the wireless LAN and the wired LAN. The communication unit 25 may also be configured by a communication interface compliant with a communication standard other than LAN standards (for example the USB standard).

The reading unit 26 includes a linear image sensor having reading elements arranged in an arrangement direction. The reading unit 26 is configured to read an image of an original document supported by a transparent platen by moving the image sensor in a direction (hereinafter referred to also as a sub-scanning direction) orthogonal to the arrangement direction of the reading devices of the image sensor (hereinafter referred to also as a main scanning direction). The reading unit 26 is also configured to read the image of the original document by stopping the image sensor at the reading position and conveying the original document by an ADF to thereby move the original document in the sub-scanning direction at the reading position. The ADF is an abbreviation for Automatic Document Feeder.

The printing unit 27 is configured to print the image on a sheet-type recorded medium. In the case of the embodiment, the printing unit 27 includes an ink-jet type printing mechanism. Note that the printing unit 27 may be configured to print the image by a well-known recording system other than the ink-jet type printing system (for example, an electrophotographic system).

The file server 30 is a server for providing a storing area of a file accessible via the LAN 40, and is configured by, for example, a NAS (Network Attached Storage). When the file is stored in the storing area on the file server 30, both of the information processing apparatus 10A and the information processing apparatus 10B are able to access the file on the file server 30. That is, the information processing apparatus 10A and the information processing apparatus 10B can share the file on the file server 30.

[Scan Result Storing Processing]

Next, a scan result storing processing executed by the processing unit 11 of the information processing apparatus 10A will be explained with reference to FIG. 2 and FIG. 3. The scan result storing processing is executed by the first processing unit 111 (strictly, the processing unit 11 executing processing as the first processing unit 111, hereinafter referred to merely as the first processing unit 111). The scan result storing processing is executed when the user executes an operation of using a scan function of the image processing apparatus 20 (for example, an operation of clicking an icon indicating the scan function) by using a UI (user interface) provided by the first processing unit 111.

When the scan result storing processing is started, the first processing unit 111 receives a scan setting created by the user (S101). At S101, the first processing unit 111 displays a scan setting screen 50 illustrated in FIG. 4 on the display 13, and keeps on standby in a state in which the user operation through the input unit 14 is receivable. On the scan setting screen 50, a document size button 51, a color setting button 52, a resolution button 53, a duplex scanning button 54, an all setting button 55, and a scan button 56 are displayed.

Figure 4:
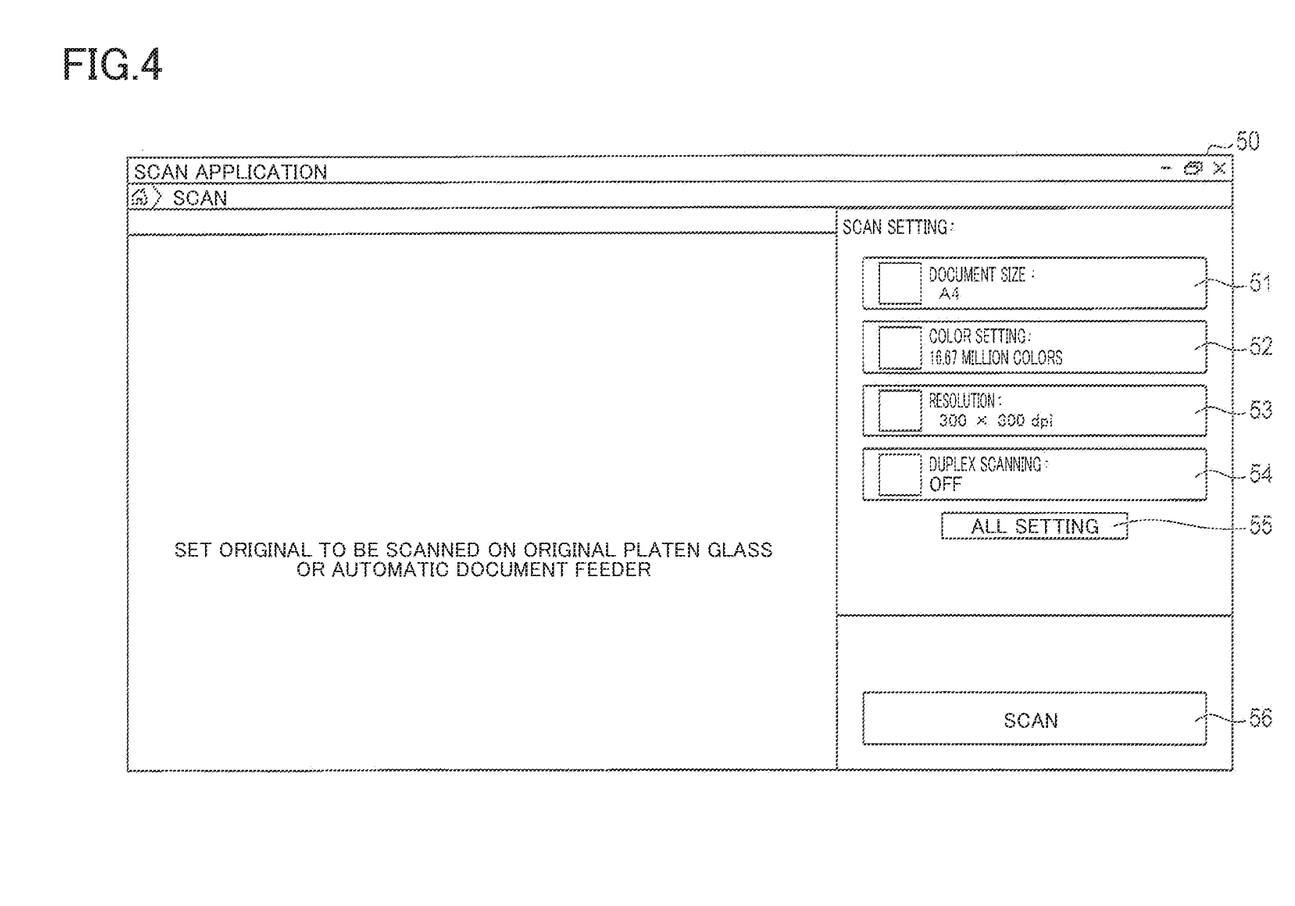
FIG. 4 is an explanatory view for a scan setting screen.

In the document size button 51, the color setting button 52, the resolution button 53, and the duplex scanning button 54, present setting values of setting items respectively corresponding to the buttons are displayed. When the setting contents of these setting items are changed, the respective buttons are clicked to change the setting contents. When the setting contents of other setting items are changed, the all setting button 55 is clicked to change the setting contents. After the desired setting is completed, when the scan button 56 is clicked, the process proceeds to S103 of FIG. 2.

Next, the first processing unit 111 executes a processing corresponding to scanning in the image processing apparatus 20 (S103). At S103, a command for instructing the execution of the scanning, information relating to the setting contents set at S101 and so on are transmitted from the information processing apparatus 10A to the image processing apparatus 20. The image processing apparatus 20 which has received these command and information is configured to execute the scanning in accordance with the instructed setting contents, and configured to transmit image data obtained as a scan result from the image processing apparatus 20 to the information processing apparatus 10A. The information processing apparatus 10A receives the scan result.

Subsequently, the first processing unit 111 receives a scan result storing instruction (S105). At S105, the first processing unit 111 displays a scan-result storing instruction screen 60 illustrated in FIG. 5 on the display 13, and keeps on standby in the state in which the user operation in the input unit 14 is receivable. On the scan-result storing instruction screen 60, a preview area 61, a "store in PC" button 62, a "store in cloud service" button 63, an "open in application" button 64, and an "attach to email" button 65 are displayed. In the preview area 61, the image scanned by the image processing apparatus 20 is displayed.

Figure 6:
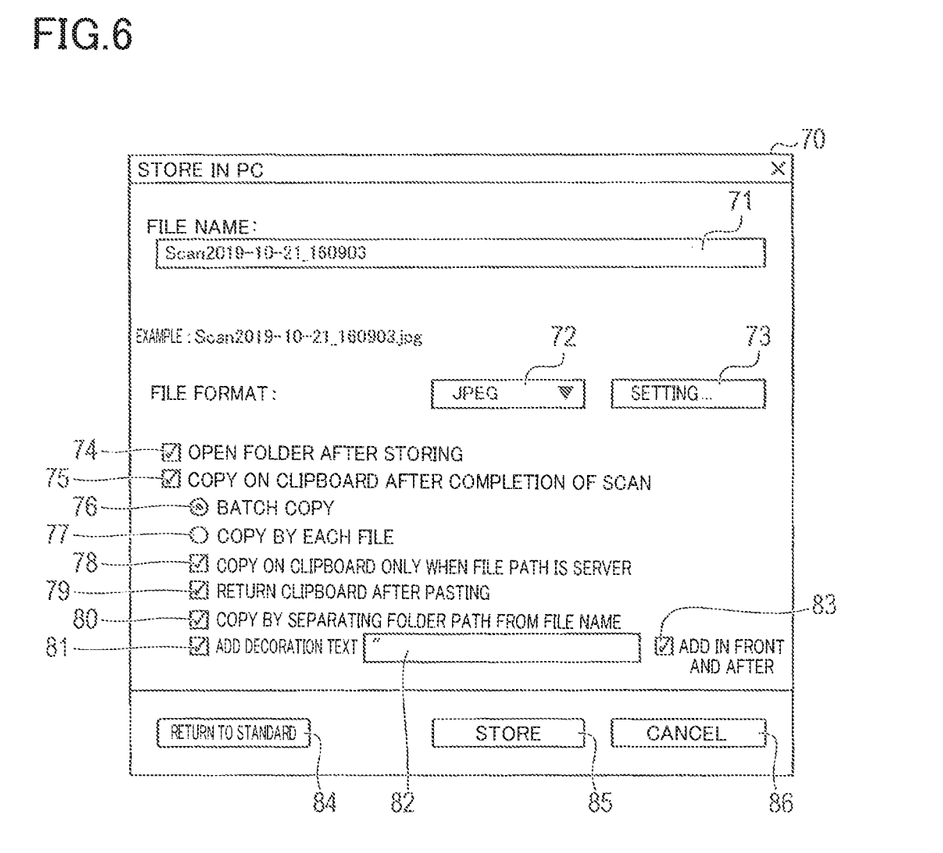
FIG. 6 is an explanatory view for a PC storing setting screen.

At S105, when the "store in PC" button 62 is clicked, the first processing unit 111 displays a PC storing setting screen 70 illustrated in FIG. 6 on the display 13, and keeps on standby in the state in which the user operation in the input unit 14 is receivable. On the PC storing setting screen 70, a path name input field 71, a file format selection field 72, a file format setting button 73, a "open folder after storing" check field 74, a "copy on clipboard after completion of scan" check field 75, a "batch copy" radio button 76, a "copy by each file" radio button 77, a "copy on clipboard only when file path is server" check field 78, a "return clipboard after pasting" check field 79, a "copy by separating folder path from file name" check field 80, an "add decoration text" check field 81, a decoration text input field 82, an "add in front and after" check field 83, a "return to standard" button 84, a "store" button 85, and "cancel" button 86 are disposed. In a case where the setting contents of these setting items are changed, an input operation is executed in accordance with an input form by each setting item to thereby change the setting contents. The check field 75 indicates whether the path name is copied on the clipboard after the completion of scan or not, and is an example of a first object. The check field 76 indicates whether a plurality of path names are copied on the clipboard in a batch or one or a plurality of path names are copied on the clipboard by each file, and is an example of a second object.

When the "store" button 85 is clicked after a desired setting is completed on the PC storing setting screen 70, a scan result is stored, as an image file, with the file path inputted in the path name input field 71 and in the file format selected in the file format selection field 72. In a case where the "open folder after storing" check field 74 is checked, a folder in which the file is stored is opened after the file is stored. When these processing is completed, S105 of FIG. 2 is ended.

Figure 5:
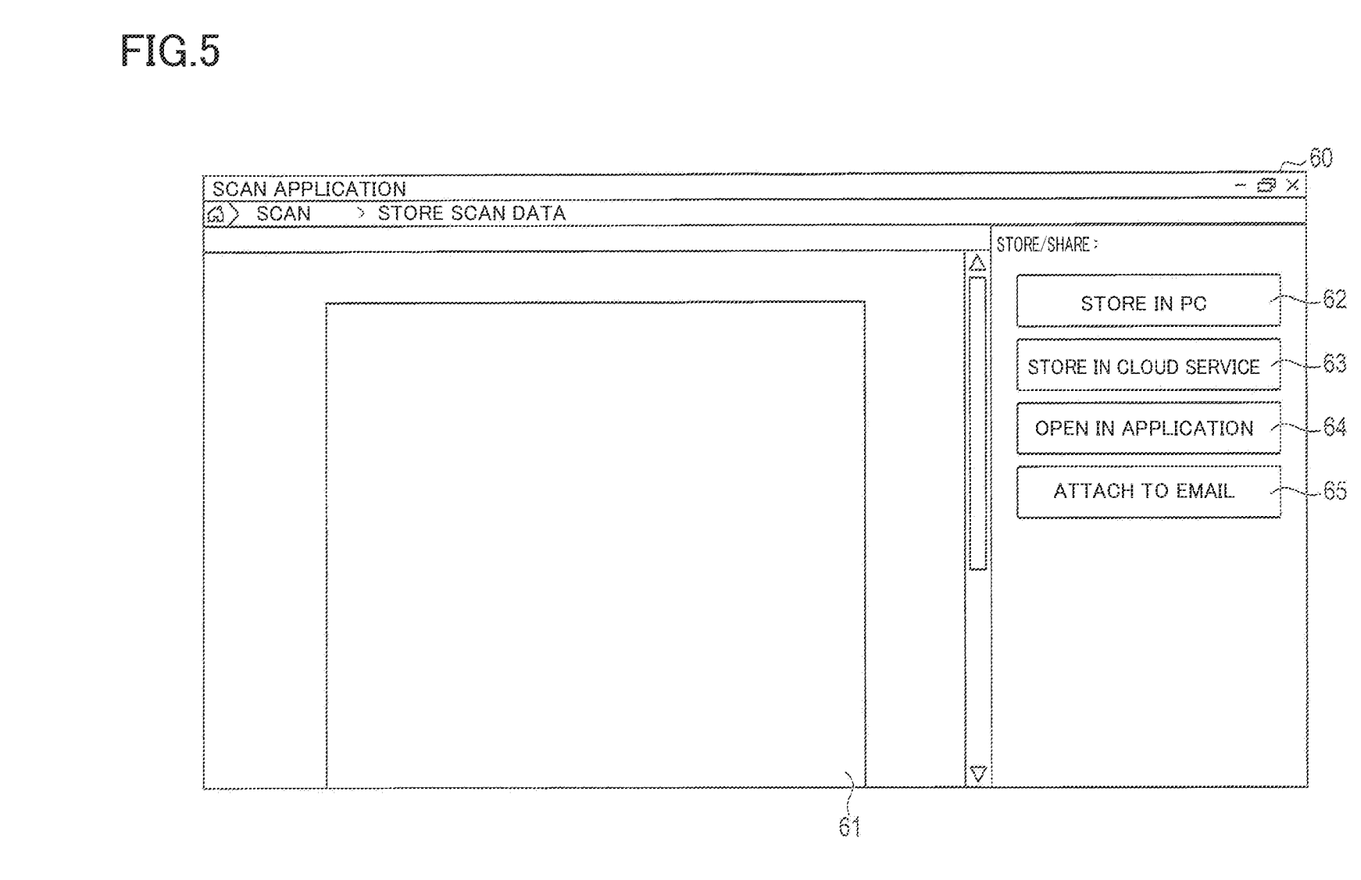
FIG. 5 is an explanatory view for a scan-result storing instruction screen.

When the scan-result storing instruction screen 60 illustrated in FIG. 5 is displayed on the display 13, the "store in cloud service" button 63, there is a situation in which one of the "open in application" button 64, and the "attach to email" button 65 is clicked. In this case, the process proceeds to a processing corresponding to each button, but the processing is not a relevant part of the present embodiment; therefore, further explanation is omitted.

Next, the first processing unit 111 determines whether setting indicates that the file path is copied on the clipboard 12A after the completion of scan or not (S106). At S106, whether the "copy on clipboard after completion of scan" check field 75 is checked or not is determined. At S106, when it is determined that the setting indicates that the file path is not copied on the clipboard 12A after the completion of scan (S106: NO), it is not necessary to copy the file path; on the clip board 12A, the scan result storing processing illustrated in FIG. 2 and FIG. 3 is ended.

On the other hand, when it is determined that the setting indicates that the file path is copied on the clipboard 12A after the completion of scan at S106 (S106: YES), the first processing unit 111 determines whether there is a setting in which the file path is copied only when the file path is the server or not (S107). At S107, it is determined whether the "copy on clipboard only when file path is server" check field 78 is checked or not. At S107, when it is determined that there is the setting in which the file path is copied only when the file path is the server (S107: YES), the first processing unit 111 determines whether the file path is the server or not (S109).

Figure 2:
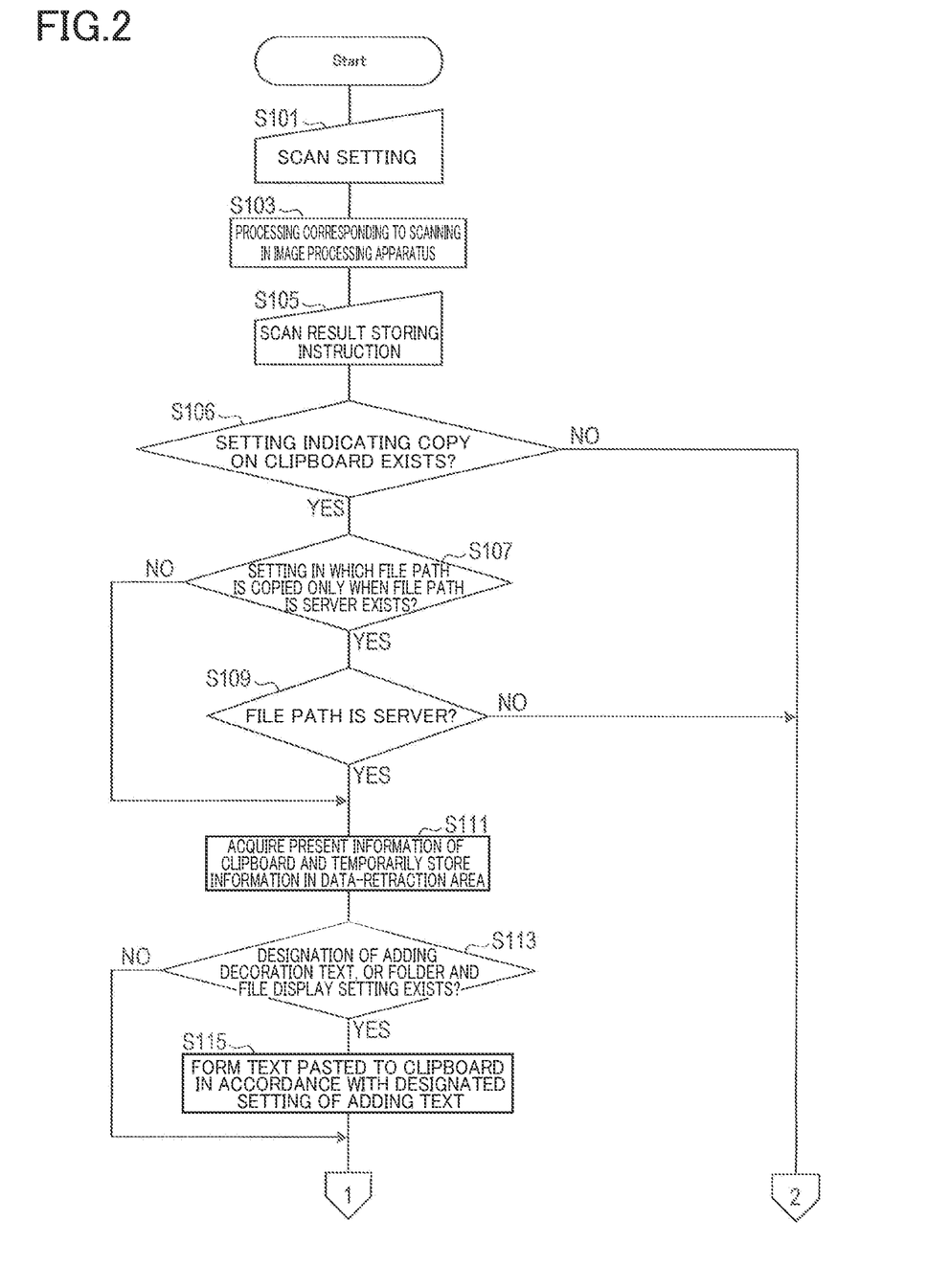
FIG. 2 is a flowchart of a scan result storing processing (No. 1)
Figure 3:
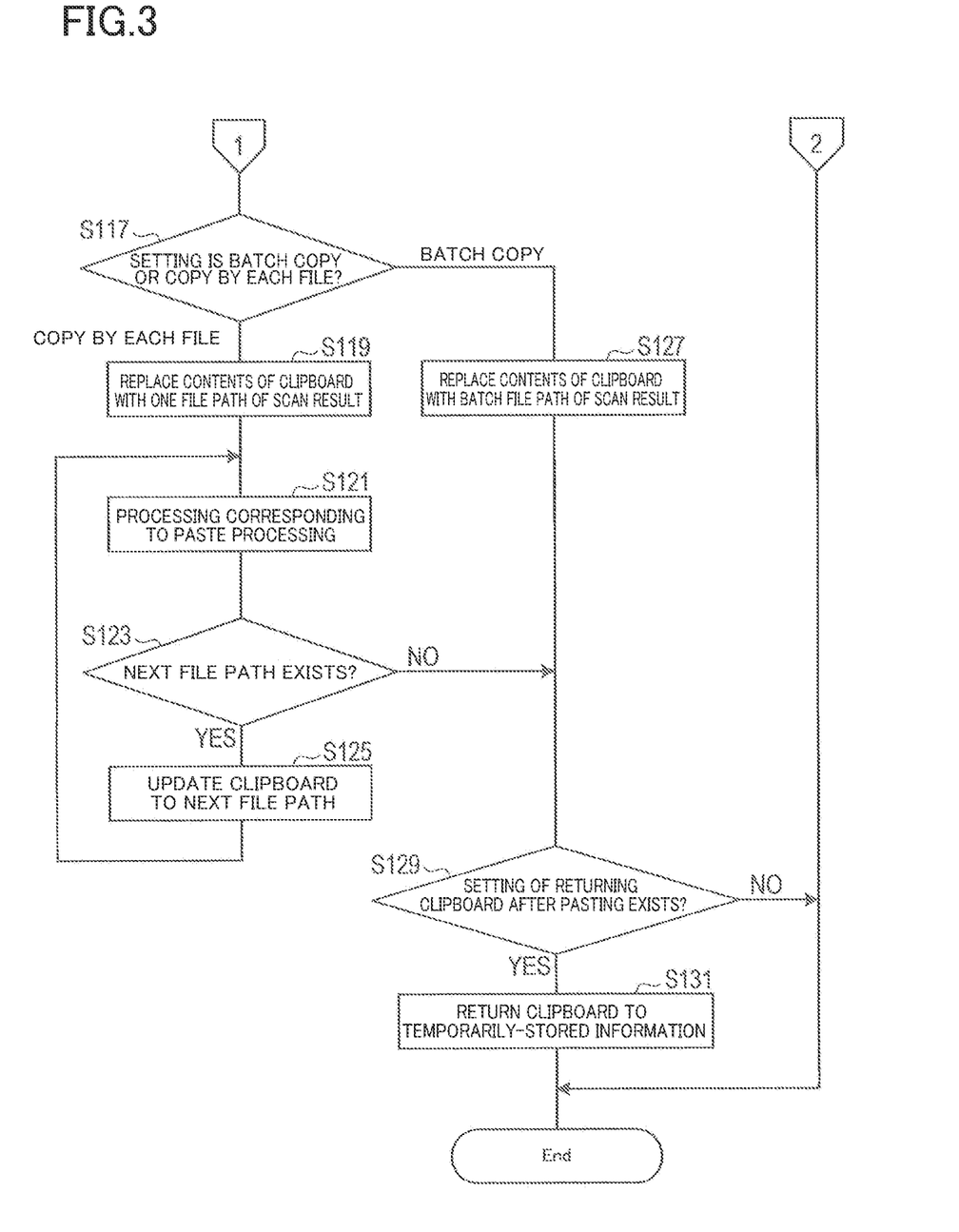
FIG. 3 is a flowchart of a scan result storing processing (No. 2)

When it is determined that the file path is not the server at S109 (S109: NO), it is not necessary to copy the file path;

therefore, the scan result storing processing illustrated in FIG. 2 and FIG. 3 is ended. On the other hand, when it is determined that these is not the setting in which the file path is copied only when the file path is the server (S107: NO), it is necessary to copy the file path, therefore, the process proceeds to S111. Also, when it is determined that the file path is the server (S109: YES), it is necessary to copy the file path, therefore, the process proceeds to S111.

When the process proceeds to S111, the first processing unit 111 obtains present information of the clipboard 12A and temporarily stores the information in the data-retraction area 12B (S111). Subsequently, the first processing unit 111 determines whether there is designation of adding decoration text or setting of displaying the folder and the file or not (S113). At S113, whether there is the designation of adding decoration text or not is determined based on whether the "add decoration text" check field 81 is checked or not. Moreover, whether there is the setting of displaying the folder and the file or not is determined based on whether the "copy by separating folder path from file name" check field 80 is checked or not.

At S113, when there is at least one of the designation of adding decoration text and the setting of displaying the folder and the file, namely, when at least one of the "add decoration text" check field 81 and the "copy by separating folder path from file name" check field 80 is checked (S113: YES), the first processing unit 111 forms text to be pasted on the clipboard 12A in accordance with the designated setting of adding text (S115).

At S115, the decoration text (characters or a character string) inputted in the decoration text input field 82 is added to the path name. When the "add in front and after" check field 83 is checked, the same decoration text is added both in front of and after the path name. When the "add in front and after" check field 83 is not checked, the decoration text is added in front of the path name. For example, when "(double quotation mark) is inputted in the decoration text input field 82 and the "add in front and after" check field 83 is checked as illustrated in FIG. 6, a character string in which the path name is sandwiched by the double quotation marks is formed. The difference in forming method in the setting of displaying the folder and the file will be explained later.

On the other hand, when there is no designation of adding the decoration text and no setting of displaying the folder and the file at S113, namely, both of the "add decoration text" check field 81 and the "copy by separating folder path from file name" check field 80 are not checked (S113: NO), the process proceeds to S117. When S115 is ended, the process proceeds to S117. When the process proceeds to S117, the first processing unit 111 determines whether the setting indicates the batch copy or copy by each file (S117).

At S117, the process branches according to which of the "batch copy" radio button 76 and the "copy by each file" radio button 77 is selected. Only one of the "batch copy" radio button 76 and the "copy by each file" radio button 77 can be selected as an object. At S117, when it is determined that the copy by each file is selected (S117: copy by each file), the first processing unit 111 replaces the content of the clipboard 12A with a one file path of the scan result (S119). More specifically, the scan result may be stored as a plurality of image files. Even in such case, at S119, only one path name, of one file, of a plurality of path names respectively corresponding to the plurality of image files is copied on the clipboard 12A.

Next, the first processing unit 111 executes a processing corresponding to a paste processing (S121). Specifically, the first processing unit 111 monitors a state of the clipboard 12A and detects whether the paste processing has been executed or not. For example, when the paste processing is executed by the second processing unit 112, the execution of paste processing is detected at S121. When the execution of paste processing is detected at S121, S121 is ended.

Subsequently, the first processing unit 111 determines whether there is a next file path or not (S123). At S123, it is determined whether an unprocessed path name which is not subjected to processing at S119 remains in a plurality of path names corresponding to the scan result. When it is determined that there is a next file path at S123 (S123: YES), the first processing unit 111 updates the clipboard 12A to the next file path (S125). At S125, one of the unprocessed path names is copied on the clipboard 12A.

When S125 is ended, the process returns to S121. Accordingly, process steps of S121 to S125 are repeated while it is determined that there is a next file path at S123. Then, a processing of copying one path name on the clipboard 12A is repeated every time the paste processing is executed by the second processing unit 112 or the like. On the other hand, when it is determined that there is no next file path at S123 (S123: NO), the process proceeds to step S129.

On the other hand, when it is determined that the setting is the batch copy at S117 (S117: batch copy), the first processing unit 111 replaces the content of the clipboard 12A with a batch file path of the scan result (S127). At S127, all the plurality of path names corresponding to the scan result are copied on the clipboard 12A. When S127 is ended, the process proceeds to Step S129.

When the process proceeds from S123 or S127 to S129, the first processing unit 111 determines whether there is a setting of returning the clipboard 12A after pasting or not (S129). At S129, whether the "return clipboard after pasting" check field 79 is checked or not is determined. When it is determined that there is the setting of returning the clipboard 12A after pasting (S129: YES) at S129, the first processing unit 111 returns the clipboard 12A to temporarily-stored information (S131). At S131, information on the clipboard 12A temporarily stored in the data-retraction area 12B at S111 is returned to the clipboard 12A. When S131 is ended, the scan result storing processing illustrated in FIG. 2 and FIG. 3 is ended. When it is determined that there is no setting of returning the clipboard 12A after pasting at S129 (S129: NO), the scan result storing processing illustrated in FIG. 2 and FIG. 3 is ended.

Next, results obtained by execution of the pasting processing by the second processing unit 112 when the above scan result storing processing is executed by the first processing unit 111 will be explained with reference to specific examples illustrated in FIG. 7A to FIG. 7D, and FIG. 8A to FIG. 8D. In FIG. 7A to FIG. 7D, and FIG. 8A to FIG. 8D, text edition screens 100 displayed on the display 13 when the second processing unit 112 functions are exemplified. Each text edition screen 100 includes a text edition area 105.

Figure 7A:
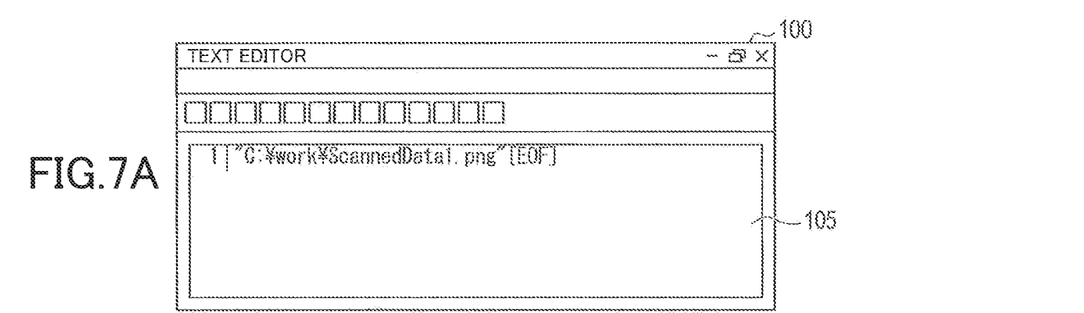
FIG. 7A is an explanatory view for an edition screen of Text editor (No. 1)
Figure 7B:
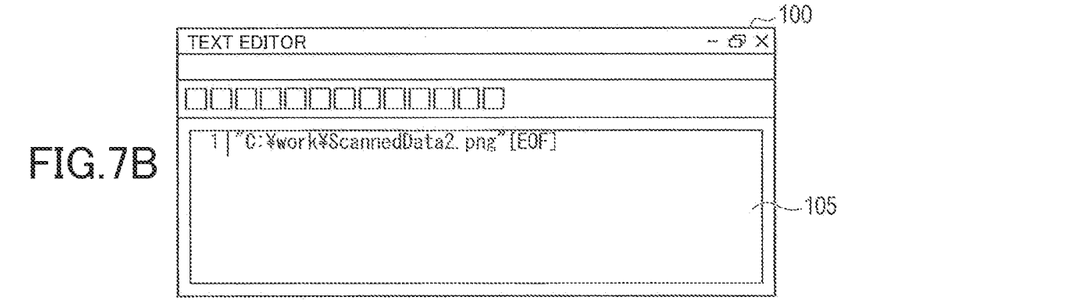
FIG. 7B is an explanatory view for an edition screen of Text editor (No. 2)
Figure 7C:
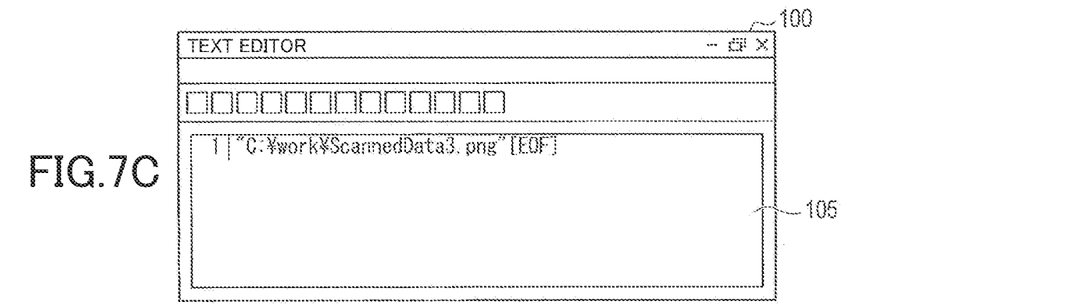
FIG. 7C is an explanatory view of an edition screen of Text editor (No. 3)

First, an example illustrated in FIG. 7A to FIG. 7C is an example corresponding to a case where there are three files corresponding to the scan result, the copy setting to the clipboard 12A is "copy by each file", and the folder and file display setting is "OFF".

In this case, when the scan result storing processing is executed in the first processing unit 111, the first path name in three path names respectively corresponding to the three files is copied on the clipboard 12A at S119. After that, when the first paste processing is executed in the second processing unit 112, one path name is pasted on the edition screen of the second processing unit 112 as shown in FIG. 7A. In this case, the path name is pasted in a full-path format without separating the folder path from the file name as the folder and file display setting is "OFF".

A character string in the full-path format is a character string which can be obtained if text is not formed at S115. However, in the example illustrated in FIG. 7A, a case where "(double quotation mark) is inputted in the decoration text input field 82 and the "add in front and after" check field 83 is checked is cited. Accordingly, S115 is executed in this case, and the character string in which the path name is sandwiched by two "(double quotation mark) is formed.

In the first processing unit 111, the first paste processing in the second processing unit 112 is detected at S121. In this case, S125 is executed, and one of remaining two unprocessed path names is copied on the clipboard 12A. After that, when the second paste processing is executed by the second processing unit 112, the second path name is pasted on the edition screen of the second processing unit 112 as illustrated in FIG. 7B.

In the first processing unit 111, the second paste processing in the second processing unit 112 is detected at S121. In this case, the remaining one unprocessed path name is copied on the clipboard 12A by executing S125. After that, when the paste processing is executed by the second processing unit 112, the third path name is pasted on the edition screen of the second processing 112 as illustrated in FIG. 7C. In the first processing unit 111, the paste processing in the second processing unit 112 is detected at S121. In this case, it is determined that there is no file path at S123, and the scan result storing processing is ended after subsequent processing is executed.

Figure 7D:
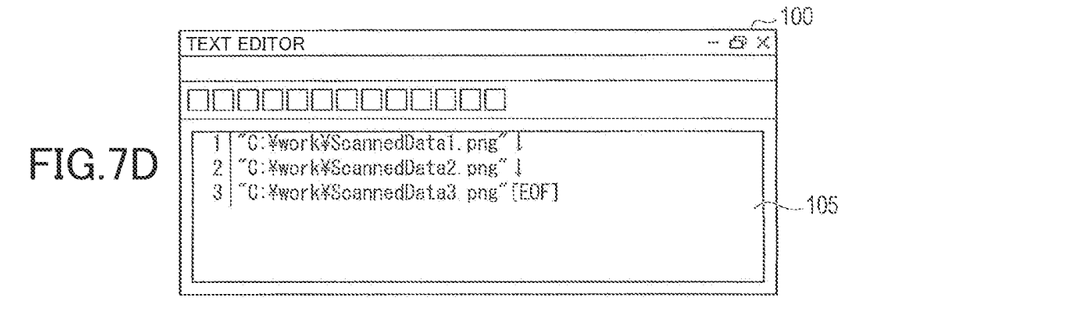
FIG. 7D is an explanatory view for an edition screen of Text editor (No. 4)

Next, an example illustrated in FIG. 7D is an example corresponding to a case where there are three files corresponding to the scan result, the copy setting with respect to the clipboard 12A is the "batch copy", and the folder and file display setting is "OFF".

In this case, when the scan result storing processing is executed by the first processing unit 11, all path names respectively corresponding to the three files are copied on the clipboard 12A at S127. After that, when the paste processing is executed by the second processing unit 112, the three path names are pasted on the edition screen of the second processing unit 112 as illustrated in FIG. 7D. The three path names are pasted in the full-path format without separating the folder path from the file name in this case as the folder and file display setting is "OFF". In the example illustrated in FIG. 7D, the case where "(double quotation mark) is inputted in the decoration text input field 82 and the "add in front and after" check field 83 is checked is illustrated. When S127 is ended, the scan result storing processing is ended after subsequent processing is executed.

Figure 8A:
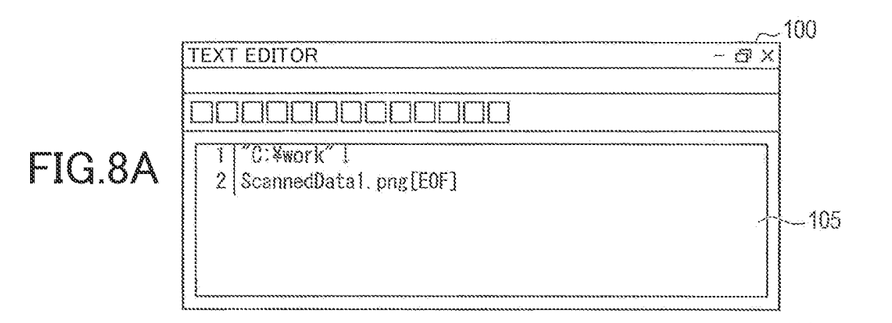
FIG. 8A is an explanatory view for an edition screen of Text editor (No. 5)
Figure 8B:
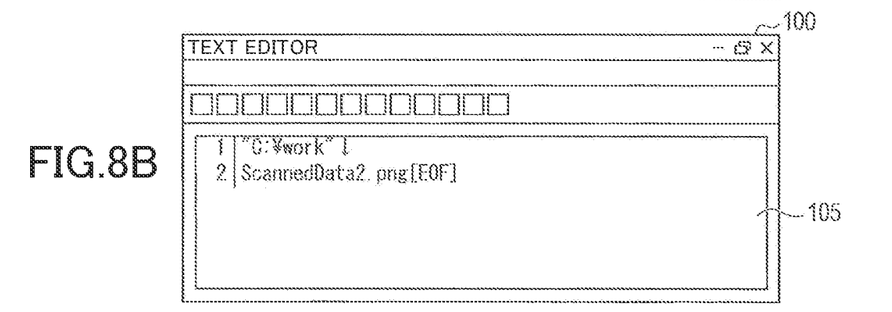
FIG. 8B is an explanatory view for an edition screen of Text editor (No. 6)
Figure 8C:
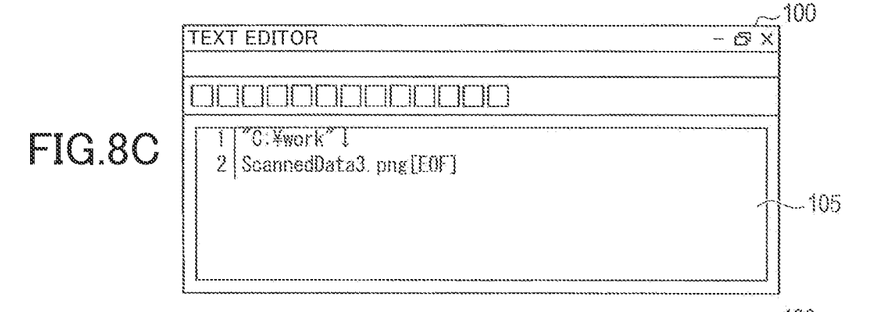
FIG. 8C is an explanatory view for an edition screen of Text editor (No. 7)

Next, an examples illustrated in FIG. 8A to FIG. 8C is an example corresponding to a case where there are three files corresponding to the scan result, the copy setting with respect to the clipboard 12A is the "copy by each file", and the folder and file display setting is "ON".

In this case, when the scan result storing processing is executed by the first processing unit 111, the first path name of three path names respectively corresponding to the three files is copied on the clipboard 12A by the S119. After that, when the first paste processing is executed by the second processing unit 112, the first path name is pasted on the edition screen of the second processing unit 112 as illustrated in FIG. 8A. The path name is pasted in a manner in which the folder path is separated from the file name and pasted in two rows in this case as the folder and file display setting is "ON".

These folder path and the file name are character strings formed in advance at S115. In the example illustrated in FIG. 8A, the case where "(double quotation mark) is inputted in the decoration text input field 82 and the "add in front and after" check field 83 is checked is cited. The character string in which the folder path is sandwiched by two "(double quotation mark) is also a character string formed at S115.

In the first processing unit 111, the first paste processing by the second processing unit 112 is detected in S121. In this case, one of remaining two unprocessed path names is copied on the clipboard 12A by executing S125. After that, when the second paste processing is executed by the second processing unit 112, the second path name is pasted on the edition screen of the second processing unit 112 as illustrated in FIG. 8B. Also in this case, the folder path is separated from the file name and pasted in two rows as the folder and file display setting is "ON".

In the first processing unit 111, the second paste processing by the second processing unit 112 is detected at S121. In this case, one remaining unprocessed path name is copied on the clipboard 12A by executing S125. After that, when the paste processing is executed by the second processing unit 112, the third path name is pasted on the edition screen of the second processing unit 112 as illustrated in FIG. 8C. Also in this case, the folder path is separated from the file name and pasted in two rows as the folder and file display setting is "ON". In the first processing unit 111, the paste processing by the second processing unit 112 is detected at S121. In that case, it is determined that there is no next file path at S123, and the scan result storing processing is ended after subsequent processing is executed.

Figure 8D:
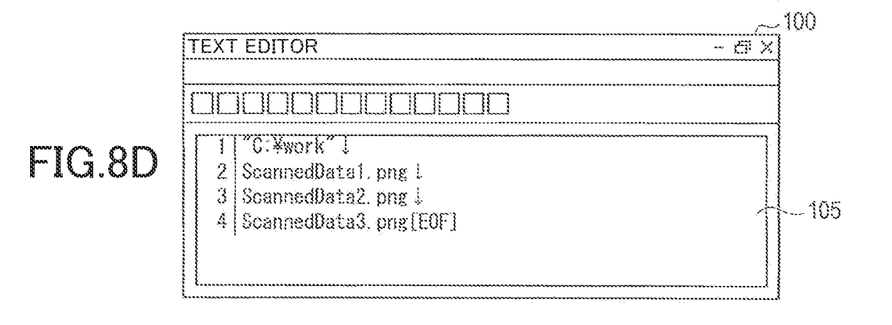
FIG. 8D is an explanatory view for an edition screen of Text editor (No. 8).

Next, an example illustrated in FIG. 8D is an example corresponding to a case where there are three files corresponding to the scan result, the copy setting to the clipboard 12A is the "batch copy", and the folder and file display setting is "ON".

In this case, when the scan result storing processing is executed by the first processing unit 111, all three path names respectively corresponding to the three files are copied on the clipboard 12A by the S127. After that, when the paste processing is executed by the second processing unit 112, the three path names are pasted on the edition screen of the second processing unit 112 as shown in FIG. 8D. The three path names are pasted in a manner in which one folder path is separated from three file name and pasted in four rows in this case as the folder and file display setting is "ON". The folder path and the file names are character strings formed in advance at S115.

[Advantages]

As described above, according to the information processing apparatus 10A, a part (for example, the folder path or the file name) or all (for example, the full path) of the path name of the file stored in the first processing unit 111 is copied on the clipboard 12A (corresponding to an example of the shared storage area in the present disclosure) as data to be processed. Therefore, after the processing by the first processing unit 111 is executed, data to be processed copied on the clipboard 12A can be pasted on the paste target area (for example, the edition screen of Text editor) only by executing the past processing by the second processing unit 112.

In the case of the embodiment, user operations relating to setting of the storing processing or the copy processing can be achieved by using objects contained in the PC storing setting screen 70 (corresponding to an example of a setting screen in the present disclosure) (for example, the path name input field 71, the file format selection field 72, the file format setting button 73, the "open folder after storing" check field 74, the "copy on clipboard after completion of scan" check field 75, the "batch copy" radio button 76, the "copy by each file" radio button 77, the "copy on clipboard only when file path is server" check field 78, the "return clipboard after pasting" check field 79, the "copy by separating folder path from file name" check field 80, the "add decoration text" check field 81, the decoration text input field 82, and the "add in front and after" check field 83).

In the case of the embodiment, whether the copy processing is executed or not can be set by using the "copy on clipboard after completion of scan" check field 75.

In the case of the embodiment, whether the plurality of file paths for the plurality of files are copied on the clipboard 12A in a batch or copied on the clipboard 12A by each file can be set by using the "batch copy" radio button 76 and the "copy by each file" radio button 77.

In the case of the embodiment, the decoration text (corresponding to an example of additional data in the present disclosure) is added to the file path (an example of data to be processed in the present disclosure), and the file path and the decoration text can be stored in the clipboard 12A.

In the case of the embodiment, the first processing unit 111 executes the storing processing (S111) of storing the data stored in the clipboard 12A in the data-retraction area 12B and the return processing (S131) of returning the data stored in the data-retraction area 12B to the clipboard 12A. Accordingly, it is possible to prevent data stored in the clipboard 12A before execution of processing by the first processing unit 111 from being lost by the execution of processing by the first processing unit 111.

In the case of the embodiment, the storage area provided in the storage unit 12 of the information processing apparatus 10A and a storage area provided in a storage device included in the file server 30 (corresponding to an example of an external device in the present disclosure) capable of communicating with the information processing apparatus 10A can be used as file storage areas respectively.

Other Embodiments

The program, the information processing apparatus and the information processing method have been explained by citing the illustrative embodiment as the above; however, the above embodiment is cited as one aspect of the present disclosure. That is, the present disclosure is not limited to the above illustrative embodiment and may be achieved in various manners within a scope not departing from technical ideas of the present disclosure.

For example, the example of adding the decoration text in front of the path name and the example of adding the decoration text in front of and after the path name are illustrated in the above embodiment; however, the state of addition is not limited to the above examples. As a specific example, for example, the decoration text may be added after the path name. Moreover, when the path name is displayed by text of one row or more, text displayed at an upper row of the text of one row or more as a header or text displayed at a lower row of the text of one row or more as a footer may be added. It is also preferable to line up the file names by being separated by commas, or by tabs. In this case, the commas and tabs correspond to the decoration text.

The example in which the folder path name and the file name are copied on the clipboard 12A in a separated manner by forming the full path name of the file is explained in the above embodiment; however, it is also preferable that other elements are extracted and copied in the clipboard 12A. For example, a server name, a drive letter, and an extension may be extracted from the full path name, and may be individually copied in the clipboard 12A.

In the above embodiment, Text editor is cited as the example of the second processing unit 112; however, the second processing unit 112 may be configured by application software having other functions as long as it is application software capable of executing the paste processing. Specifically, the second processing unit 112 may be a mailer having edition/transmission functions of emails, a browser having a browsing function of Web files, or a file manager having a management function of files.

Although not particularly mentioned in the above embodiment, the first processing unit 111 may be configured to execute a processing as the first processing unit 111 by a plurality of processes or a plurality of tasks cooperating together. For example, a first process of executing processing of obtaining the scan result and a second process of copying the path name on the clipboard 12A are configured as separate processes, and processing as the first processing unit 111 may be executed by cooperation of these processes. In this case, for example, even when the first process is ended, the second process may be stationed on the information processing apparatus 10A so as to continue monitoring of the clipboard 12A or the copy processing on the clipboard 12A.

Note that a plurality of functions realized by one component illustrated in the embodiment may be realized by a plurality of components. One function realized by one component illustrated in the embodiment may be realized by a plurality of components. A plurality of functions realized by a plurality of components illustrated in the embodiment may be realized by one component. One function realized by a plurality of components illustrated in the embodiment may be realized by one component. A part of components illustrated in the embodiment may be omitted. At least a part of components illustrated in one embodiment in the above embodiments may be added to or replaced with components illustrated in the embodiments other than one embodiment.

What is claimed is:

1. A non-transitory storage medium storing a program readable by a computer of an information processing apparatus, the information processing apparatus comprising a processing unit and a storage unit,
   wherein, when executed by the computer, the program causes the information processing apparatus to execute a first processing and a second processing,
   wherein the storage unit includes a shared storage area accessed by the processing unit at the time of executing the first processing and the second processing,
   wherein, when executed by the computer, the program causes the information processing apparatus to execute
      in the first processing, (i) a storing processing of storing image data, as a file into a file storage area, received from an image processing apparatus capable of communicating with the information processing apparatus, and (ii) a copy processing of storing at least a part of a path name, as data to be processed into the shared storage area, the path name being designated to the file stored in the storing processing,
      in the second processing, a paste processing of pasting the data to be processed stored in the shared storage area to a paste target area,
   wherein the pasted data, including the at least the part of the path name, is stored in the shared storage area at least until the paste processing is executed, wherein, when executed by the computer, the program causes the information processing apparatus to execute a displaying processing of displaying a setting screen on which a path-name-copying image, to which a user instruction of storing the path name into the shared storage area is input, is displayed, and wherein, in a case where the user instruction is input to the path-name-copying image, the at least the part of the path name is stored into the shared storage area in the copying processing.

2. The non-transitory storage medium according to claim 1, wherein the first processing includes a setting processing in which a setting screen containing objects for receiving user operations relative to setting of the storing processing or the copy processing is displayed on a display of the information processing apparatus to receive the user operations with respect to the objects.

3. The non-transitory storage medium according to claim 2, wherein the objects include a first object for setting whether the copy processing is executed or not, and wherein, when executed by the computer, the program causes the information processing apparatus
to execute the copy processing when the first object indicates that the copy processing is executed, and
not to execute the copy processing when the first object indicates that the copy processing is not executed.

4. The non-transitory storage medium according to claim 2, wherein, in a case where a plurality of files are stored in the storing processing, the objects include a second object for setting whether a plurality of pieces of data are stored in a batch or stored by each file, the plurality of files each as the file respectively corresponding to the plurality of pieces of data each as the data to be processed,
wherein, when the second object indicates that the plurality of files are stored in a batch, the plurality of pieces of data to be processed are stored into the shared storage area in a batch in the copy processing, and
wherein, when the second object indicates that each of the plurality of pieces of data is stored by each file, after one of the plurality pieces of data to be processed is stored into the shared storage area in the copy processing, another of the plurality of pieces of data to be processed is stored into the shared storage area every time when the paste processing is completed in the second processing, said another of the plurality of pieces of data being not copied to the shared storage area yet.

5. The non-transitory storage medium according to claim 1, wherein the data to be processed and additional data added to the data to be processed are stored in the shared storage area in the copy processing.

6. The non-transitory storage medium according to claim 1, wherein, in the storing processing, a storage area provided in the storage unit of the information processing apparatus and a storage area in a storage device of an external device capable of communicating with the information processing apparatus are usable as file storage areas.

7. A non-transitory storage medium storing a program readable by a computer of an information processing apparatus, the information processing apparatus comprising a processing unit and a storage unit,
wherein, when executed by the computer, the program causes the information processing apparatus to execute a first processing and a second processing,
wherein the storage unit includes a shared storage area accessed by the processing unit at the time of executing the first processing and the second processing, wherein, when executed by the computer, the program causes the information processing apparatus to execute
in the first processing, (i) a storing processing of storing image data, as a file into a file storage area, received from an image processing apparatus capable of communicating with the information processing apparatus, and (ii) a copy processing of storing at least a part of a path name, as data to be processed into the shared storage area, the path name being designated to the file stored in the storing processing, and
in the second processing, a paste processing of pasting the data to be processed stored in the shared storage area to a past target area, and wherein the first processing includes
a moving processing of moving, to a data-retraction area, data stored in the shared storage area at the time before the copy processing is executed, and
a return processing of returning the moved data moved to the data retraction area by the moving processing to the shared storage area when the paste processing is completed, for the data to be processed stored in the shared storage area by the copy processing, in the second processing.

8. An information processing apparatus comprising:
a processing unit; and
a storage unit,
wherein the processing unit executes at least a first processing and a second processing,
wherein the storage unit includes a shared storage area accessed by the processing unit at the time of executing the first processing and the second processing,
wherein the processing unit is configured to execute
in the first processing, (i) a storing processing of storing image data, as a file into a file storage area, received from an image processing apparatus capable of communicating with the information processing apparatus; and (ii) a copy processing of storing at least a part of a path name, as data to be processed into the shared storage area, the path name being designated to the file stored in the storing processing, and
in the second processing, a paste processing of pasting the data to be processed stored in the shared storage area to a paste target area,
wherein the pasted data, including the at least the part of the path name, is stored in the shared storage area at least until the paste processing is executed,
wherein the processing unit is further configured to execute a displaying processing of displaying a setting screen on which a path-name-copying image, to which a user instruction of storing the path name into the shared storage area is input, is displayed, and
wherein, in a case where the user instruction is input to the path-name-copying image, the at least the part of the path name is stored into the shared storage area in the copying processing.

9. An information processing method of an information processing apparatus comprising:
a first processing step; and
a second processing step,
wherein the information processing apparatus includes a processing unit and a storage unit,
wherein the storage unit includes a shared storage area accessed by the processing unit at the time of executing the first processing step and the second processing step,
wherein the first processing step includes
a storing processing step of storing image data, as a file into a file storage area, received from an image processing apparatus capable of communicating with the information processing apparatus, and a copy processing step of storing at least a part of a path name, as data to be processed into the shared storage area, the path name being designated to the file stored in the storing processing step, wherein the second processing step includes a paste processing step of pasting the data to be processed stored in the shared storage area to a paste target area, and wherein the pasted data, including the at least the part of the path name, is stored in the shared storage area at least until the paste processing step is executed, wherein the information processing method further comprises a displaying step of displaying a setting screen on which a path-name-copying image, to which a user instruction of storing the path name into the shared storage area is input, is displayed, and wherein, in a case where the user instruction is input to the path-name-copying image, the at least the part of the path name is stored into the shared storage area in the copying processing.

* * * * *

UNITED STATES PATENT AND TRADEMARK OFFICE
CERTIFICATE OF CORRECTION

PATENT NO. : 11,467,893 B2
APPLICATION NO. : 17/159403
DATED : October 11, 2022
INVENTOR(S) : Masafumi Kawaguchi Page 1 of 1

It is certified that error appears in the above-identified patent and that said Letters Patent is hereby corrected as shown below:

In the Claims

<u>Column 15, Claim 9, Lines 9-10:</u>
Please change: "stored in the shared storage area to a paste target area, and" to -- stored in the shared storage area to a paste target area, --

Signed and Sealed this
Eighth Day of October, 2024

Katherine Kelly Vidal
*Director of the United States Patent and Trademark Office*